US011005781B2

(12) United States Patent
Zuo

(10) Patent No.: US 11,005,781 B2
(45) Date of Patent: *May 11, 2021

(54) NETWORKING METHOD FOR DATA CENTER NETWORK AND DATA CENTER NETWORK

(71) Applicant: HUAWEI TECHNOLOGIES CO., LTD., Shenzhen (CN)

(72) Inventor: Shaofu Zuo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,373

(22) Filed: Apr. 1, 2019

(65) Prior Publication Data
US 2019/0230050 A1 Jul. 25, 2019

Related U.S. Application Data

(63) Continuation of application No. 15/954,615, filed on Apr. 17, 2018, now Pat. No. 10,284,497, which is a (Continued)

(51) Int. Cl.
G06F 15/16 (2006.01)
H04L 12/933 (2013.01)
(Continued)

(52) U.S. Cl.
CPC ........ H04L 49/1515 (2013.01); H04L 45/586 (2013.01); H04L 63/02 (2013.01);
(Continued)

(58) Field of Classification Search
CPC ....... H04L 45/245; H04L 45/22; H04L 45/28; H04L 49/1515; H04L 63/02;
(Continued)

(56) References Cited

U.S. PATENT DOCUMENTS 8,406,128 B1 3/2013 Brar et al.
8,489,718 B1 * 7/2013 Brar ...................... H04L 49/356
709/222

(Continued)

FOREIGN PATENT DOCUMENTS

CN 101873306 A 10/2010
CN 103608797 A 2/2014
(Continued)

Primary Examiner — Hieu T Hoang
(74) Attorney, Agent, or Firm — Kilpatrick Townsend & Stockton LLP

(57) ABSTRACT

Embodiments of the present invention disclose a networking method for a data center network and a data center network, where the data center network includes multiple deployment units; each deployment unit includes at least two Spine switches and at least one Leaf Switch; each Leaf switch inside each deployment unit is connected to at least two Spine switches of all Spine switches inside the deployment unit; and between at least two deployment units, at least one Spine switch inside each deployment unit is connected to at least one Spine switch inside each of other deployment units. A connection relationship between Spine switches in deployment units is set up, so that in a condition of adding no network device, communication between different deployment units can be implemented, which decreases network complexity, and increases the network management and maintenance efficiency.

13 Claims, 9 Drawing Sheets

Related U.S. Application Data continuation of application No. PCT/CN2015/097937, filed on Dec. 18, 2015.

(51) Int. Cl.

| | | |
|---|---|---|
| *H04L 12/713* | (2013.01) | |
| *H04L 29/06* | (2006.01) | |
| *H04L 12/709* | (2013.01) | |
| *H04L 12/707* | (2013.01) | |
| *H04L 12/931* | (2013.01) | |
| *H04L 12/721* | (2013.01) | |

(52) U.S. Cl.
CPC ............ *H04L 45/22* (2013.01); *H04L 45/245* (2013.01); *H04L 45/34* (2013.01); *H04L 45/72* (2013.01); *H04L 49/10* (2013.01); *H04L 49/70* (2013.01)

(58) Field of Classification Search
CPC ....... H04L 45/586; H04L 45/34; H04L 49/10; H04L 49/70; H04L 45/72; Y02D 50/30
See application file for complete search history.

(56) References Cited

U.S. PATENT DOCUMENTS

| | | | |
|---|---|---|---|
| 8,495,194 | B1 | 7/2013 | Brar et al. |
| 9,491,121 | B2* | 11/2016 | Bao ................ H04L 49/25 |
| 9,755,965 | B1* | 9/2017 | Yadav ............. H04L 41/0806 |
| 10,051,761 | B2* | 8/2018 | Narayanan ........ H05K 7/1498 |
| 2010/0265849 | A1 | 10/2010 | Harel |
| 2012/0033669 | A1* | 2/2012 | Mohandas .......... H04L 45/245 |
| | | | 370/392 |
| 2012/0033678 | A1* | 2/2012 | Page ................. H04L 45/28 |
| | | | 370/401 |
| 2012/0128004 | A1* | 5/2012 | Aybay ............... G06F 13/4022 |
| | | | 370/401 |
| 2012/0182866 | A1* | 7/2012 | Vinayagam ......... H04L 45/245 |
| | | | 370/228 |
| 2012/0250679 | A1 | 10/2012 | Judge et al. |
| 2014/0047252 | A1* | 2/2014 | Ansari ............... G06F 1/26 |
| | | | 713/320 |
| 2014/0056317 | A1* | 2/2014 | Sanders ............. H04J 3/1629 |
| | | | 370/474 |
| 2014/0098823 | A1 | 4/2014 | Kapadia et al. |
| 2014/0195694 | A1* | 7/2014 | Sait ................. H04L 47/41 |
| | | | 709/239 |
| 2014/0198636 | A1* | 7/2014 | Thayalan ........... H04L 49/25 |
| | | | 370/228 |
| 2014/0204805 | A1 | 7/2014 | Aziz et al. |
| 2014/0241205 | A1 | 8/2014 | Virk et al. |
| 2014/0379895 | A1* | 12/2014 | Jain .................. H04L 41/0654 |
| | | | 709/224 |
| 2015/0036480 | A1* | 2/2015 | Huang .............. H04L 41/0663 |
| | | | 370/220 |
| 2015/0207724 | A1* | 7/2015 | Choudhury ........ H04L 41/12 |
| | | | 370/255 |
| 2015/0236980 | A1 | 8/2015 | Brar et al. |
| 2015/0295655 | A1 | 10/2015 | Hessong et al. |
| 2015/0341183 | A1 | 11/2015 | Song et al. |
| 2017/0026233 | A1* | 1/2017 | Boutros ............ H04L 41/5054 |
| 2017/0063631 | A1* | 3/2017 | Curtis ............... H04L 41/12 |
| 2017/0078409 | A1* | 3/2017 | Yazir ................ G06F 16/245 |

FOREIGN PATENT DOCUMENTS

| | | |
|---|---|---|
| CN | 103873373 A | 6/2014 |
| CN | 104737507 A | 6/2015 |
| CN | 104937892 A | 9/2015 |

\* cited by examiner

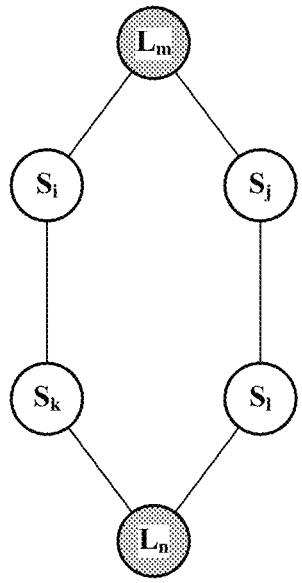
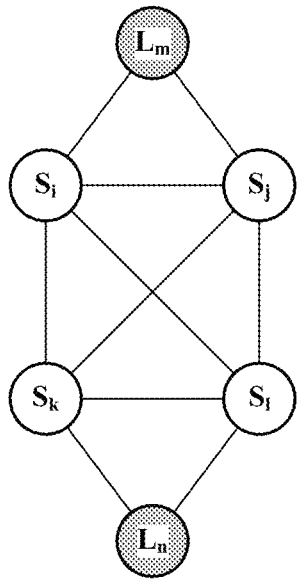
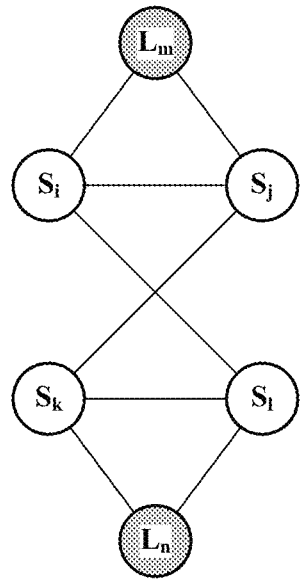
FIG. 3(a)　　　　FIG. 3(b)　　　　FIG. 3(c)
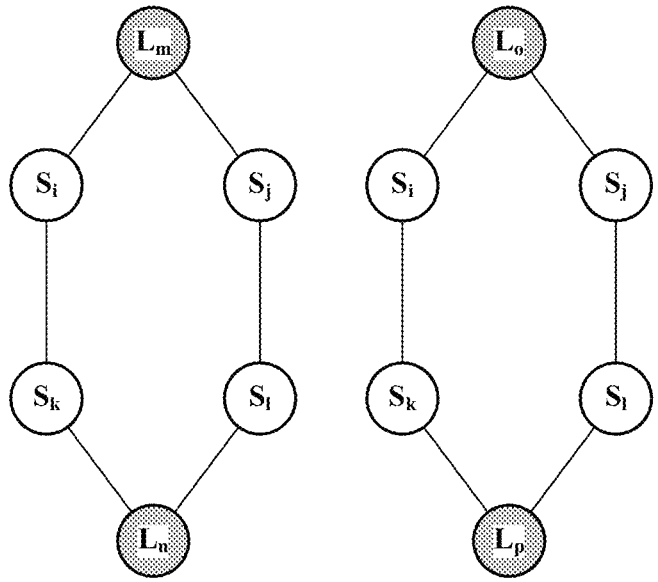
FIG. 4

NETWORKING METHOD FOR DATA CENTER NETWORK AND DATA CENTER NETWORK

CROSS-REFERENCE TO RELATED APPLICATIONS

This application is a continuation of U.S. patent application Ser. No. 15/954,615, filed on Apr. 17, 2018, which is a continuation of International Application No. PCT/CN2015/097937, filed on Dec. 18, 2015. Both of the aforementioned applications are hereby incorporated by reference in their entireties.

TECHNICAL FIELD

The present invention relates to the field of network technologies, and in particular, to a networking method for a data center network and a data center network.

BACKGROUND

In a data center (Data Center), a rack unit (Rack Unit, or Rack for short) may accommodate multiple servers. Each server may be configured to manage one or more virtual machines VM (Virtual Machine). A server in the rack unit is connected to a Top of Rack (Top-of-Rack, ToR) switch. The Top of Rack switch (ToR Switch) is connected to another Top of Rack switch by using a Spine switch (Spine Switch) or a Spine switch fabric (Spine Fabric). In the data center, a network including a Top of Rack switch and a Spine switch is used to implement data communication between devices (physical machines and/or virtual machines) that are located in different rack units.

With rapid development in applications of cloud computing and big data, a data center network has become a research hotspot of various parties in academia and in industry in recent years. As a data center scale keeps increasing, requirements on the data center network are becoming more.

The first conventional technology is a relatively common two-tier Spine-Leaf fabric, and the fabric includes two-tier Spine-Leaf switches, where a Leaf switch is generally disposed on a top of a server rack, is used as an access switch of the server rack, and is also referred to as a Top-of-Rack (Top-of-Rack, ToR) switch, and a Spine switch is used as an aggregation (Aggregation) switch. A Spine switch and a Leaf switch that are included in this type of fabric are connected by using a Clos network (that is, each Spine switch at a Spine switch tier is connected to each Leaf switch at a Leaf switch tier). If a two-tier Spine-Leaf plane fabric is used, a data center scale depends on a quantity of downlink ports on a Spine switch. Therefore, the fabric is not applicable to construction of a large-scale or an ultra-large-scale data center.

Based on the above, the second conventional technology is a three-tier Core-Spine-Leaf plane fabric, which includes the two-tier Spine-Leaf fabric and a Core tier that is newly added on a basis of the two-tier Spine-Leaf fabric. A Spine switch and a Leaf switch are connected by using a Clos network, to form a network unit, and a Core switch tier and a Spine switch inside each network unit are also connected by using a Clos network. By means of forwarding by the Core switch tier, it can be implemented that multiple network units form a larger-scale network. If the second conventional technology is used, a problem about expansion of the data center scale is resolved to some extent; however, for construction of the data center network, in the fabric, a Core tier needs to be deployed outside a network unit, which increases network complexity and increases costs of network management and maintenance.

SUMMARY

In view of the above, embodiments of the present invention provide a networking method for a data center network and a data center network, to decrease network construction complexity and increase the management and maintenance efficiency.

According to a first aspect, a networking method for a data center network is provided, including: providing at least two deployment units, where each deployment unit includes at least two Spine switches and at least one Leaf Switch; setting up, inside each deployment unit, connections between each Leaf switch inside the current deployment unit and at least two Spine switches of the Spine switches inside the current deployment unit; and setting up, between every two deployment units, a connection between at least one Spine switch inside a first deployment unit and at least one Spine switch inside a second deployment unit. In the implementation manner provided above, a connection between Spine switches of deployment units is set up, to meet a requirement on communication across the deployment units.

With reference to the first aspect, in a first possible implementation manner, inside each deployment unit, a connection between each Spine switch inside the deployment unit and each Leaf switch inside the deployment unit is set up. In this implementation manner, a Spine switch and a Leaf switch inside a deployment unit are connected by using a CLOS network, so that non-blocking communication can be implemented.

With reference to the first implementation manner of the first aspect, in a second possible implementation manner, at least one Spine switch group is determined from Spine switches included in the at least two deployment units in the data center network, where the Spine switch group includes at least one Spine switch inside each deployment unit; and inside the Spine switch group, a connection between each Spine switch of each deployment unit and each Spine switch inside each of other deployment units is set up. In this implementation manner, a Spine switch group is determined and a connection relationship between any two Spine switches inside the Spine switch group is set up, so that communication across deployment units is implemented by connecting the Spine switches inside the group.

As an expansion of the second possible implementation manner of the first aspect, two Spine switches in one deployment unit may be selected into the Spine switch group. In this case, a connection between each of the two Spine switches and each of other Spine switches inside the Spine switch group needs to be set up. This expansion implements a Spine switch backup inside a deployment unit, that is, when a Spine switch is faulty and cannot forward a communication message, another Spine switch may be used to forward or route a communication message between a server (a physical machine or a virtual machine) that is connected to a Leaf switch inside the deployment unit and a server that is connected to a Leaf switch inside another deployment unit.

As another expansion of the second possible implementation manner of the first aspect, there may be multiple Spine switch groups selected from a Spine switch tier, and a connection between each Spine switch inside the multiple Spine switch groups and each of other Spine switches is set up. Compared with a manner of setting up a Spine switch intra-group connection in the second possible implementation manner of the first aspect, a manner of setting up connections inside all the multiple Spine switch groups can increase communication links between different deployment units and improve reliability of communication across the deployment units.

With reference to the first possible implementation manner of the first aspect, in a third possible implementation manner, in Spine switches included in the at least two deployment units, a connection between each Spine switch and each of other Spine switches inside the at least two deployment units is set up; that is, a full-interconnection manner is used for networking among the Spine switches. Non-blocking communication can be implemented among the Spine switches by using the full-interconnection manner.

With reference to the first implementation manner of the first aspect, in a fourth possible implementation manner, at least one Spine switch group is determined from Spine switches included in the at least two deployment units, where the Spine switch group includes at least one Spine switch of each deployment unit; and a connection between each Spine switch inside the Spine switch group and each Spine switch outside the Spine switch group is set up. Compared with the Spine switch full-interconnection manner in the third possible implementation manner of the first aspect, the Spine switch inter-group full-interconnection manner saves ports used to connect each Spine switch and other Spine switches inside the group, and these saved ports can be used to connect a newly added Leaf switch and/or a newly added Spine switch, to facilitate network scale expansion.

With reference to the first aspect, in a fifth possible implementation manner, a new Leaf switch is added inside any deployment unit of the data center network, and a connection between the newly added Leaf switch and each of at least two Spine switches inside the deployment unit in which the newly added Leaf switch is located is set up. Leaf switch expansion inside a deployment unit is implemented by using this implementation manner.

With reference to the first to the fifth implementation manners of the first aspect, in a sixth possible implementation manner, a new Leaf switch is added inside any deployment unit, and a connection between the newly added Leaf switch and each Spine switch inside the deployment unit in which the newly added Leaf switch is located is set up. In this implementation manner, Leaf switch expansion inside a deployment unit is implemented, and non-blocking information transmission is implemented by connecting a newly added Leaf switch and each Spine switch.

With reference to the first or the second implementation manner of the first aspect, in a seventh possible implementation manner, a new Spine switch is added inside any deployment unit, and a connection between the newly added Spine switch and each Leaf switch inside the deployment unit in which the newly added Spine switch is located is set up. In this implementation manner, Spine switch expansion inside a deployment unit is implemented, and non-blocking information transmission is implemented by connecting a newly added Spine switch and each Leaf switch inside the deployment unit.

With reference to the third possible implementation manner of the first aspect, in an eighth possible implementation manner, a new Spine switch is added inside any deployment unit, a connection between the newly added Spine switch and each Leaf switch inside the deployment unit in which the newly added Spine switch is located is set up, and a connection between the newly added Spine switch and each of other Spine switches in the Spine switches included in the at least two deployment units is set up. In this implementation manner, Spine switch expansion inside a deployment unit is implemented, a newly added Spine switch is connected to each Leaf switch inside the deployment unit, and CLOS connections are made between the newly added Spine switch and other Spine switches. In this way, a CLOS network connection on the newly added Spine switch is implemented inside the deployment unit, and a CLOS network connection on the newly added Spine switch is also implemented across deployment units, so that non-blocking information communication is implemented.

With reference to the fourth possible implementation manner of the first aspect, in a ninth possible implementation manner, a new Spine switch is added inside any deployment unit, and it is determined that the newly added Spine switch is included in the Spine switch group; a connection between the newly added Spine switch and each Leaf switch inside the deployment unit in which the newly added Spine switch is located is set up; and a connection between the newly added Spine switch and each of other Spine switches that is inside the at least two deployment units and that is located outside the Spine switch group in which the newly added Spine switch is located is set up.

With reference to the first possible implementation manner of the first aspect, in a tenth possible implementation manner, a new deployment unit is added in the data center network including the at least two deployment units, and the newly added deployment unit includes at least two Spine switches and at least one Leaf switch; connections between each Leaf switch and the at least two Leaf switches inside the newly added deployment unit are set up; and at least one Spine switch is selected from the newly added deployment unit, and a connection between the selected at least one Spine switch and at least one Spine switch that is inside each of other deployment units and that is outside the newly added deployment unit is set up.

With reference to the first possible implementation manner of the first aspect, in an eleventh possible implementation manner, a new deployment unit is added in the data center network including the at least two deployment units, and the newly added deployment unit includes at least two Spine switches and at least one Leaf switch; a connection between each Spine switch and each Leaf switch that are inside the newly added deployment unit is set up; and at least one Spine switch is selected from the newly added deployment unit, and a connection between the selected at least one Spine switch and at least one Spine switch that is inside each of other deployment units and that is outside the newly added deployment unit is set up.

With reference to the second possible implementation manner of the first aspect, in a twelfth possible implementation manner, a new deployment unit is added in the data center network including the at least two deployment units, and the newly added deployment unit includes at least two Spine switches and at least one Leaf switch; a connection between each Spine switch and each Leaf switch that are inside the newly added deployment unit is set up; and at least one Spine switch is selected from the newly added deployment unit, and a connection between the selected at least one Spine switch and each Spine switch inside the Spine switch group is set up.

With reference to the third possible implementation manner of the first aspect, in a thirteenth possible implementation manner, a new deployment unit is added in the data center network including the at least two deployment units, and the newly added deployment unit includes at least two Spine switches and at least one Leaf switch; a connection between each Spine switch and each Leaf switch that are inside the newly added deployment unit is set up; and a connection between each Spine switch inside the newly added deployment unit and each Spine switch inside the at least two deployment units included in the data center network is set up.

With reference to the fourth possible implementation manner of the first aspect, in a fourteenth possible implementation manner, a new deployment unit is added in the data center network including the at least two deployment units, and the newly added deployment unit includes at least two Spine switches and at least one Leaf switch; a connection between each Spine switch and each Leaf switch that are inside the newly added deployment unit is set up; at least one Spine switch is selected from the newly added deployment unit to be included in the Spine switch group; and a connection between the at least one Spine switch that is selected from the newly added deployment unit to be included in the Spine switch group and each Spine switch that is located outside the Spine switch group is set up.

With reference to the first aspect and the first to the fourteenth possible implementation manners of the first aspect, in a fifteenth possible implementation manner, at least one deployment unit is selected from the at least two deployment units included in the data center network, and an external network is connected by using a port of at least one Spine switch inside the at least one deployment unit or a port of at least one Leaf switch inside the at least one deployment unit.

With reference to the first aspect and the first to the fifteenth possible implementation manners of the first aspect, in a sixteenth possible implementation manner, the Spine switch and the Leaf switch are commercial network switches or application-specific integrated circuit ASIC chips.

According to a second aspect, a data center network is provided, where the network includes: at least two deployment units, where: each deployment unit includes at least two Spine switches and at least one Leaf Switch; each Leaf switch inside each deployment unit is connected to at least two Spine switches of all Spine switches inside the deployment unit; and between the at least two deployment units included in the data center network, at least one Spine switch inside each deployment unit is connected to at least one Spine switch inside each of other deployment units. Compared with the second conventional technology, no new Core tier needs to be added in a network using this type of fabric, and communication can be implemented between deployment units.

With reference to the second aspect, in a first possible implementation manner, each Spine switch inside each deployment unit is connected to each Leaf switch inside the deployment unit in which the Spine switch is located. Each Spine switch is connected to each Leaf switch inside a deployment unit, so that non-blocking communication can be implemented between a server under the Leaf switch and a server under another Leaf switch inside the deployment unit.

With reference to the first possible implementation manner of the second aspect, in a second possible implementation manner, at least one Spine switch group is determined from Spine switches included in the at least two deployment units in the data center network, the Spine switch group includes at least one Spine switch of each deployment unit, and inside the Spine switch group, a Spine switch of each deployment unit is connected to a Spine switch of each of other deployment units. Compared with a full-interconnection manner used by Spine switches at a Spine switch tier in the data center network, a Spine switch intra-group interconnection manner can save, in a condition of ensuring communication between two deployment units, ports used for interconnection between the Spine switches, so that these saved ports can be used to connect more Leaf switches, and network scale expansion is implemented.

With reference to the first possible implementation manner of the second aspect, in a third possible implementation manner, in Spine switches included in the at least two deployment units in the data center network, each Spine switch is connected to another Spine switch inside the at least two deployment units in the data center network. This manner is a Spine switch full-interconnection manner, and by using this manner, non-blocking forwarding of a communication message between deployment units can be ensured to a maximum extent.

With reference to the first possible implementation manner of the second aspect, in a fourth possible implementation manner, at least one Spine switch group is determined from Spine switches included in the at least two deployment units in the data center network, the Spine switch group includes at least one Spine switch of each deployment unit, and each Spine switch inside the Spine switch group is connected to each Spine switch outside the Spine switch group in which the Spine switch is located. This manner is a Spine switch inter-group full-interconnection manner, and compared with the Spine switch full-interconnection manner, this manner can save ports used for interconnection between Spine switches, so that these saved ports can be used to connect more Leaf switches, and network scale expansion is implemented.

With reference to the second aspect and the first to the fourth possible implementation manners of the second aspect, in a fifth possible implementation manner, an external network is connected by using a port of at least one Spine switch of at least one deployment unit in the data center network or a port of at least one Leaf switch of at least one deployment unit in the data center network.

With reference to the second aspect and the first to the fifth possible implementation manners of the second aspect, in a sixth possible implementation manner, the Spine switch and the Leaf switch are commercial network switches or application-specific integrated circuit ASIC chips.

BRIEF DESCRIPTION OF DRAWINGS

To describe the technical solutions in the embodiments of the present invention more clearly, the following briefly describes the accompanying drawings required for describing the embodiments of the present invention.

FIG. 3(*a*) to FIG. 3(*c*) are a schematic block diagram of a data center fabric crystal model according to the present invention;

FIG. 4 is a schematic block diagram of a crystal model of crossing-fin Spine switch intra-group interconnection according to the present invention;

DESCRIPTION OF EMBODIMENTS

Figure 1:
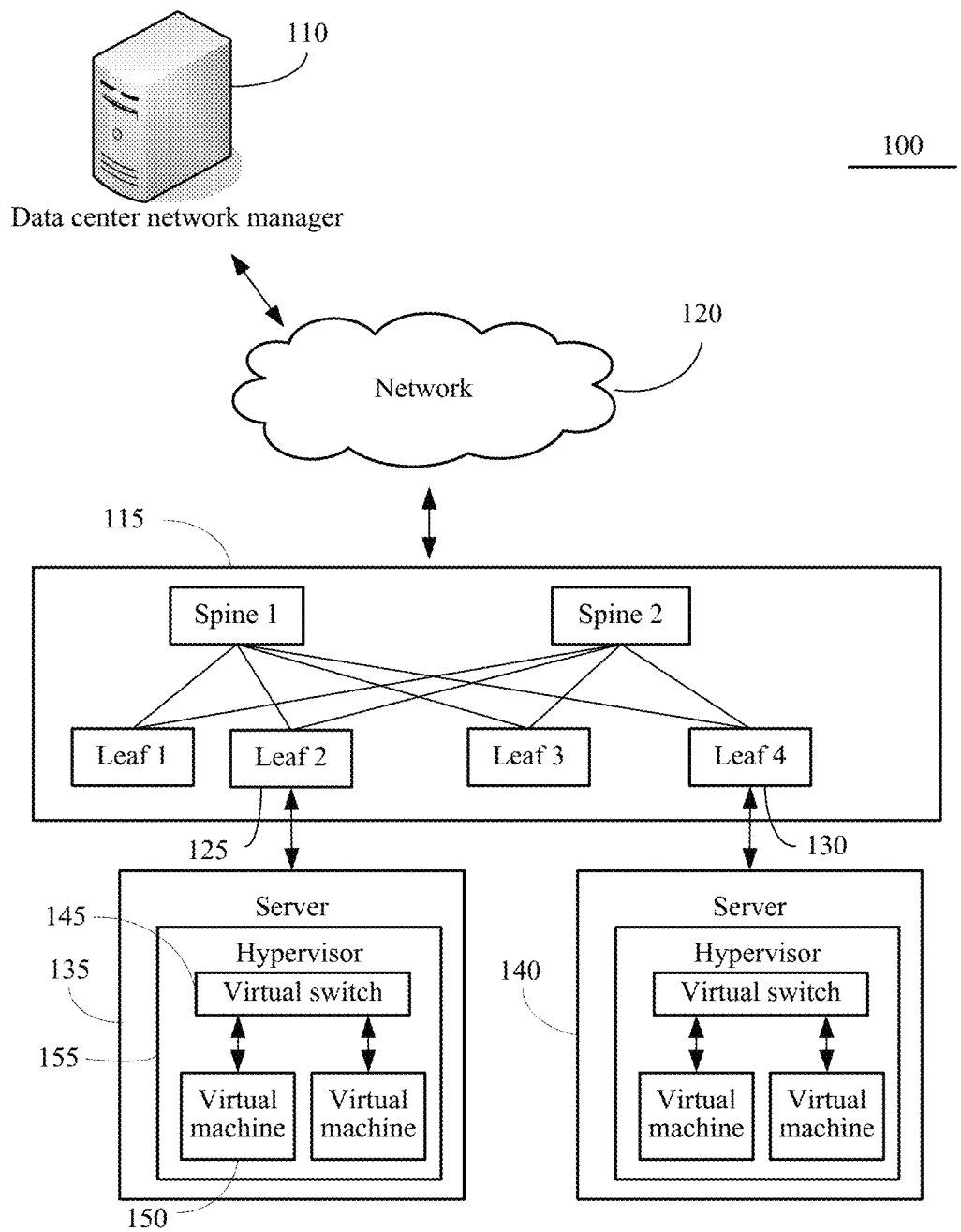
FIG. 1 is a schematic block diagram of composition of a data center system according to the present invention.

The following describes the technical solutions in the embodiments of the present invention with reference to the accompanying drawings in the embodiments of the present invention.

Generally, a program module includes a routine, program, component, data structure, and other types of structures for executing a particular task or implementing a particular abstract data type. Moreover, a person skilled in the art may understand that the embodiments may be implemented by using another computer system configuration, including a handheld device, a multiprocessor system, a microprocessor-based or programmable consumer electronic product, a small computer, a mainframe computer, and a similar computing device. The embodiments may also be implemented in a distributed computing environment in which a task is executed by a remote processing device that is connected by using a communications network. In the distributed computing environment, program modules may be located in local and remote memory storage devices.

The embodiments may be implemented as a process implemented by a computer, a computing system, or for example, a computer program product or a computer storage medium of a computer program of an instruction for a computer system to execute an exemplary process. For example, a computer-readable storage medium may be implemented by using one or more of a volatile computer memory, a non-volatile memory, a hard disk drive, a flash memory drive, a floppy disk or a compact disc, and a similar medium.

Throughout this specification, the term "data center fabric (Data Center Fabric)" is a fabric for implementing a data center by connecting all servers, and may have multiple implementation manners, for example, a two-tier plane data center fabric including Spine-Leafs, or a three-tier plane data center fabric including Core-Spine-Leafs.

Throughout this specification, the term "deployment unit" is a network unit including at least two Spine switches and at least one Leaf switch. In the unit, each Leaf switch is connected to at least two Spine switches. Preferably, the Spine switches and the Leaf switch inside the deployment unit are connected by using a CLOS network. In a HeatSink fabric provided in the embodiments of the present invention, a deployment unit refers to a fin (Fin) included in the fabric.

Throughout this specification, the term "switch" refers to a network basic component that can connect multiple network nodes and refers to a device that can implement message forwarding. The device may be a commercial network switch, or may be a functional circuit implemented by an application-specific integrated circuit ASIC chip.

Throughout this specification, the term "Leaf switch" is used as an access switch (Access Switch) in a data center fabric and is responsible for connecting a server to a data center network. For a rack server (Rack Server), a Leaf switch specifically refers to an access switch that is disposed on a top of a server rack, and is also referred to as a Top-of-Rack (Top-of-Rack, ToR) switch. For a tower server or a blade server, a Leaf switch may be implemented by using a product-shaped switch or by using a switching circuit implemented by an application-specific integrated circuit ASIC chip.

Throughout this specification, the term "Spine switch" refers to a switch performing aggregation (Aggregation) on the Leaf switch. Generally, the Spine switch is deployed at an upper tier of the Leaf switch and is used to implement a function of routing and forwarding a packet between Leaf switches. In the embodiments provided in the present invention, the Spine switch and the Leaf switch are generally connected by means of Clos networking, to implement non-blocking information forwarding.

Throughout this specification, the term "data center network manager DCNM" refers to a device for managing and controlling a switch in the HeatSink fabric. The data center network manager may be implemented in a centralized manner, for example, implemented by using one server; or may be implemented in a distributed manner, for example, implemented by using multiple servers.

Throughout this specification, the term "server (Server)" generally refers to a computing device for executing one or more software programs in a networked environment. In a specific implementation, a server may be a physical machine (Physical Machine) or a virtual machine (Virtual Machine) that is installed on a physical machine. It should be noted that for vivid description, the embodiments of the present invention are described by using a rack server (Rack server) including a rack unit (Rack Unit). It may be understood that the server may be presented in various forms, and the embodiments of the present invention are also applicable to a data center including a tower server (Tower Server) or a blade server (Blade Server).

Data Center Fabric Provided in the Embodiments of the Present Invention

An embodiment of the present invention discloses a data center fabric (Data Center Fabric), where the data center fabric is applied to data center construction.

FIG. 1 shows a data center system 100; that is, there is at least one data center network manager 110 (Data Center Network Manager, DCNM), which manages, by using a network, a data center network including a leaf switch and a Spine switch. The data center network manager 110 may be implemented in a form of a server (server) on which an application App is integrated and is responsible for network management. Each Leaf switch may be implemented in a form of a Top of Rack switch (ToR Switch), that is, each Leaf switch may be located in a rack unit Rack. FIG. 1 is used as an example: Two Leaf switches, that is, Leaf 2 125 and Leaf 4 130 may be located in a rack unit, and the rack unit can accommodate one or more servers (for example, 135 and 140 in FIG. 1). Each Leaf switch is configured to route or forward a communication message between a server in the rack unit and another network unit. Each server (the server 135 in FIG. 1 that is associated with the Leaf switch 125 is used as an example) may accommodate one or more virtual switches (Virtual Switch) 145. A virtual switch and a virtual machine are created and run on a hypervisor (Hypervisor) 155 of each server, where the hypervisor 155 implements virtualization and scheduling of a physical resource on the server, so that the physical resource is used by one or more virtual machines.

Each virtual switch 145 may be configured to manage communication between virtual machines in a virtual machine network and/or a virtual machine subnet, where the virtual machine network and/or the virtual machine subnet includes a virtual machine. Each virtual switch 145 is implemented by using software running on the server 135. In this way, the virtual switch 145 can implement a function of a physical switch. Similarly, each virtual machine 150 is implemented by using software running on the server 135. The virtual machine 150 is configured to communicate with another virtual machine by using a fabric (Fabric) 115. For the data center system 100, any quantity of servers may exist, and each server can accommodate any quantity of virtual switches and any quantity of virtual machines. For ease of description, FIG. 1 includes one server 135, the Leaf switch 125 that is associated with the server 135, one server 135, and the Leaf switch 130 that is associated with the server 135. In an example, the virtual switch 145 may manage communication among multiple virtual switches on the server 135.

The server 135 and the Leaf switch 125 that is associated with the server 135 are disposed in a rack unit (Rack Unit, or referred to as Rack) that is not shown in FIG. 1. Another server may also be accommodated in the rack. The Leaf switch 125 and the Leaf switch 130 are responsible for performing routing processing or forwarding processing on communication information of the server (including a virtual machine running on the server), as a sending party or a receiving party, in the rack. ToRs (Top-of-Rack) refer to the switches 125 and 130 and another Leaf switch in FIG. 1. The Leaf switches 125 and 130 can be used to provide a backup and fault tolerance for communication of the server, the virtual machine, and the virtual switch in the rack. In this way, the Leaf switch 125 and the ToR switch 130 are two equivalent switches. These Leaf switches and Spine switches may be configured to communicate with the data center network manager DCNM. The data center network manager DCNM may be configured to manage communication between servers (physical machines or virtual machines) inside different racks by controlling the Spine switches and the Leaf switches.

The present invention provides multiple embodiments for implementing improvement to the data center fabric (Data Center Fabric) 115.

The following separately describes the improvement to the data center fabric with reference to FIG. 2A to FIG. 2D. A person skilled in the art may understand that in a specific network construction process, an adaptive modification may be made to the data center fabric provided in the present invention because of a limitation on a construction condition and another factor, and therefore, an implementation manner provided in the present invention shall not be construed as a limitation to the protection scope of the present invention.

Data Center Fabric Embodiment 1

Figure 2A:
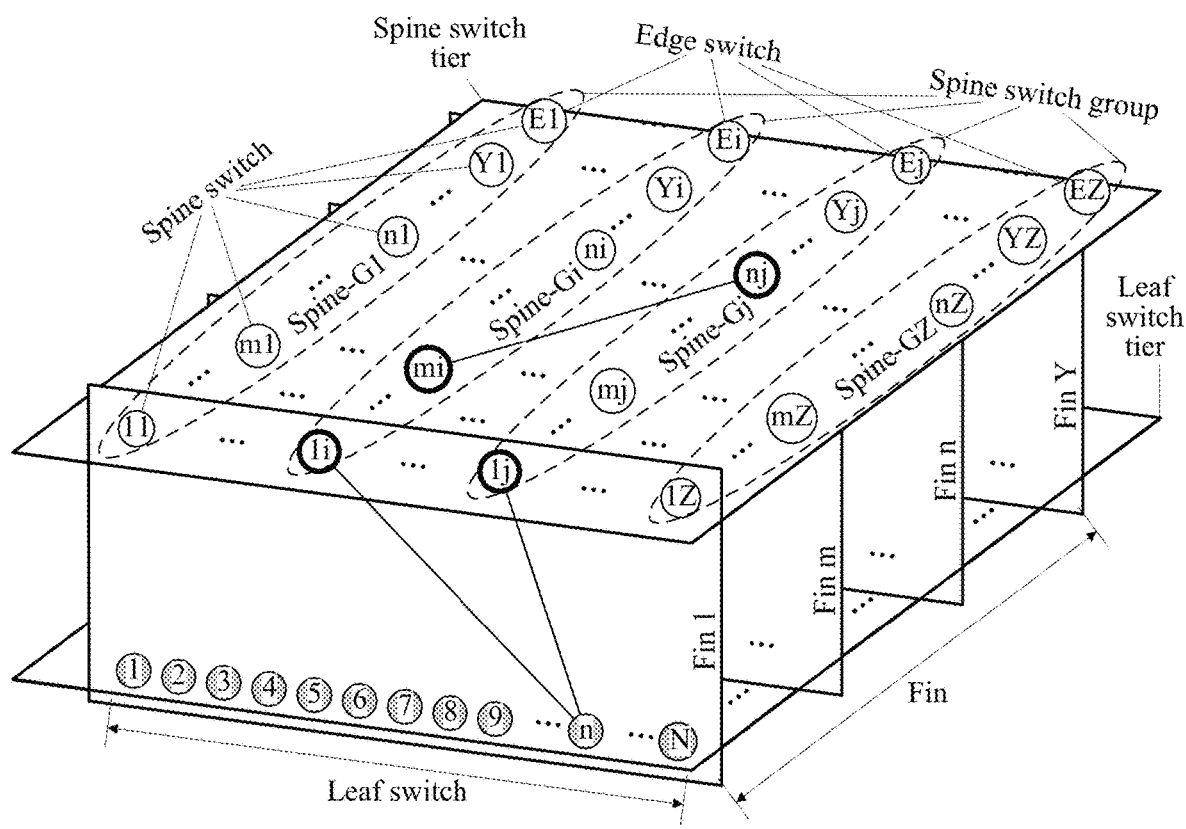
FIG. 2A to FIG. 2D are schematic block diagrams of data center fabrics according to Embodiment 1 to Embodiment 4 of the present invention.

As can be seen from FIG. 2A, a data center fabric (Data Center Fabric) includes multiple fins (Fin) and the multiple fins form a heat-sink-shaped structure. In view of this, the structure is referred to as a HeatSink fabric in this embodiment of the present invention.

Each fin in the HeatSink fabric is similar to the data center fabric that is marked by 115 in FIG. 1 and that includes a Spine switch and a Leaf switch. Each fin includes two tiers of switches, where a Spine switch set is located at an upper tier, and a Leaf switch set is located at a lower tier. A Leaf switch is used as a ToR switch and configured to connect a server that is similar to the server 135 connected to the Leaf 2 125 and the server 140 connected to the Leaf 4 130 in FIG. 1. Spine switch sets of all fins form a logical layer, which is referred to as a Spine switch tier (Spine Switch Tier). Similarly, Leaf switch sets of all the fins form a plane, which is referred to as a Leaf switch tier (Leaf Switch Tier).

From a perspective of a networking construction requirement, each fin in the HeatSink fabric includes at least two Spine switches and at least one Leaf switch. Each Leaf switch inside each fin is connected to at least two Spine switches inside the fin. In this way, when a Spine switch that is connected to a Leaf switch is faulty, another Spine switch that is not faulty and that is connected to the Leaf switch exists to forward communication data and/or an instruction.

Preferably, in this embodiment of the present invention, a connection between each Leaf switch and each Spine switch exists inside each fin (that is, a CLOS network connection is used) to implement non-blocking data forwarding.

It should be noted that the data center fabric includes at least two fins, and in each fin, a quantity of Leaf switches, a quantity of Spine switches, and a connection manner thereof are independent. For example, in FIG. 2A, Fin 1 includes eight Spine switches and ten Leaf switches; Fin 2 includes six Spine switches and nine Leaf switches; a manner in which each Leaf switch is connected to three Spine switches is used to connect the Spine switches and the Leaf switches in Fin 1; and CLOS network connections are used to connect the Spine switches and the Leaf switches in Fin 2, that is, each Leaf switch is connected to each Spine switch.

It should be noted that a Leaf switch is connected to a server in downlink (which is similar to that the Leaf 2 125 is connected to the server 135 shown in FIG. 1) and connected to a Spine switch in uplink (which is similar to that the Leaf 2 125 is connected to Spine 1 and Spine 2 shown in FIG. 1). To implement single-point non-blocking communication on a Leaf switch in each fin (that is, no blocking occur on a Leaf switch in a fin during data forwarding), it needs to be ensured that a downlink access bandwidth of any Leaf switch is not greater than an uplink bandwidth of the Leaf switch (for example, which may be implemented by configuring a network parameter. The Leaf 2 125 in FIG. 1 is used as an example: An uplink bandwidth of the Leaf 2 125 is 40 Gbps, and a downlink bandwidth for the connection to the server 135 is 30 Gbps). In addition, because there is a limitation on a quantity of physical ports on a device, a quantity of Leaf switches that can be deployed inside each fin depends on a quantity of downlink ports on a Spine switch, and a quantity of Spine switches that can be deployed inside each fin depends on a quantity of uplink ports on a Leaf switch.

In the Spine switch tier in the HeatSink fabric, a connection relationship also exists between Spine switches, and communication between servers among different fins is implemented by setting up a connection between the Spine switches. A necessary connection relationship (that is, a basic Spine switch interconnection manner) between Spine switches across fins is that at least one Spine switch inside each fin is connected to at least one Spine switch inside each of other fins. In this way, it can be ensured that a communication message of servers (physical machines or virtual machines) connected to Leaf switches inside two fins can arrive at a peer end by means of forwarding by a Spine switch. FIG. 2A is used as an example: In the Spine switch tier, for any two fins, Fin m and Fin n, a connection relationship exists between $Spine_{mi}$ and $Spine_{nj}$, where both m and n are integers, $m \neq n$, $1 \leq m \leq Y$, and $1 \leq n \leq Y$.

Data Center Fabric Embodiment 2

Figure 2B:
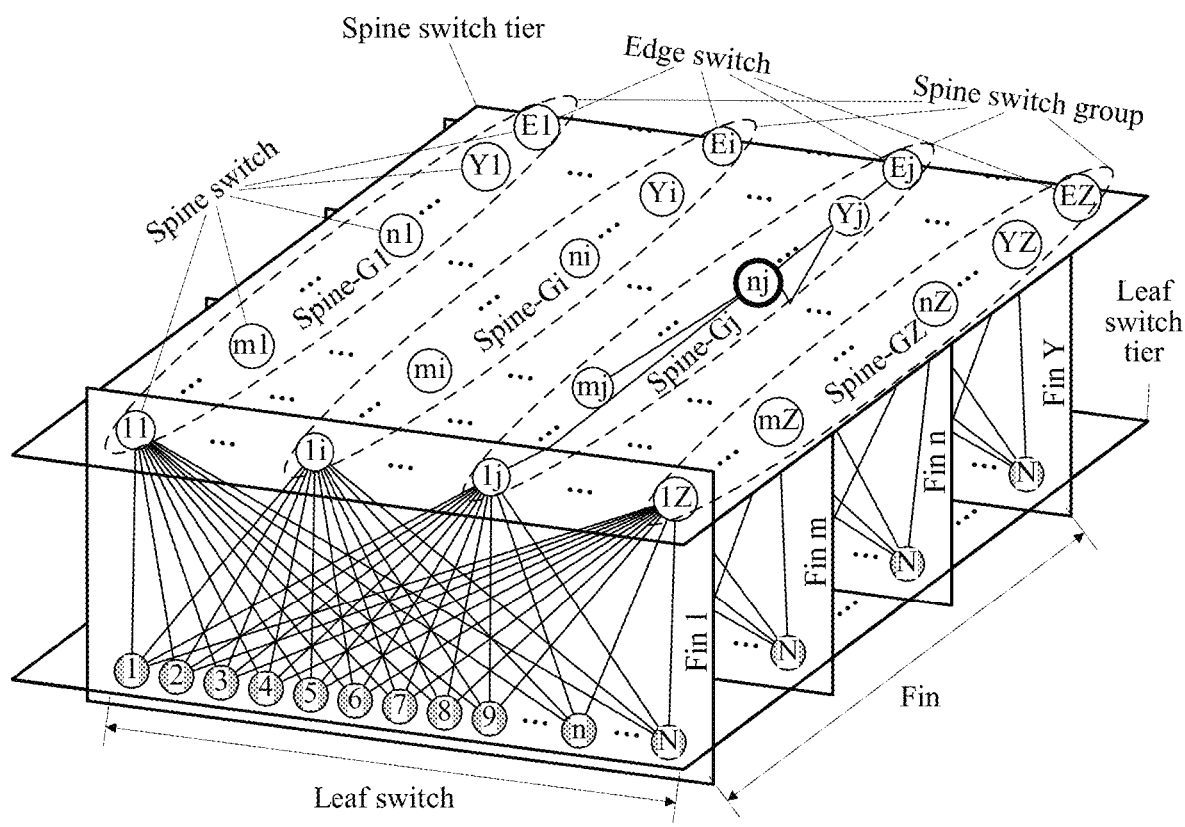

FIG. 2B provides another data center fabric embodiment, and a difference from the fabric in FIG. 2A mainly lies in that a crossing-fin Spine switch intra-group interconnection manner is used by Spine switches that are across fins.

Referring to FIG. 2B, some Spine switches are selected from a Spine switch tier included in the HeatSink fabric, to form a Spine switch group, where the Spine switch group meets the following requirement: the Spine switch group includes a Spine switch in each fin. A connection between each Spine switch and each of other Spine switches exists inside the Spine switch group.

As an expansion of this implementation manner, that two Spine switches in one fin may be selected into the Spine switch group. In this case, a connection between each of the two Spine switches and each of other Spine switches inside the Spine switch group needs to be set up. This expansion manner implements a Spine switch backup inside a fin, that is, when a Spine switch is faulty and cannot forward a communication message, another Spine switch may be used to forward or route a communication message between a server (a physical machine or a virtual machine) that is connected to a Leaf switch inside the fin and a server that is connected to a Leaf switch inside another fin.

As a further expansion of this implementation manner, there may be multiple Spine switch groups selected from the Spine switch tier, and a connection between each Spine switch inside the multiple Spine switch groups and each of other Spine switches is set up. Compared with the foregoing manner of setting up a Spine switch intra-group connection, a manner of setting up connections inside all the multiple Spine switch groups can increase communication links between different fins and improve reliability of communication across the fins.

As a possible implementation manner of Spine switch grouping, as shown in FIG. 2B, Spine switches included in the Spine switch tier are grouped by row to obtain Z Spine switch groups, which are separately Spine-G1, . . . , Spine-Gi, . . . , Spine-Gj, . . . , and Spine-GZ, at least one Spine switch group is selected from the Z Spine switch groups, and a connection between any two Spine switches inside the Spine switch group is set up.

Data Center Fabric Embodiment 3

Figure 2C:
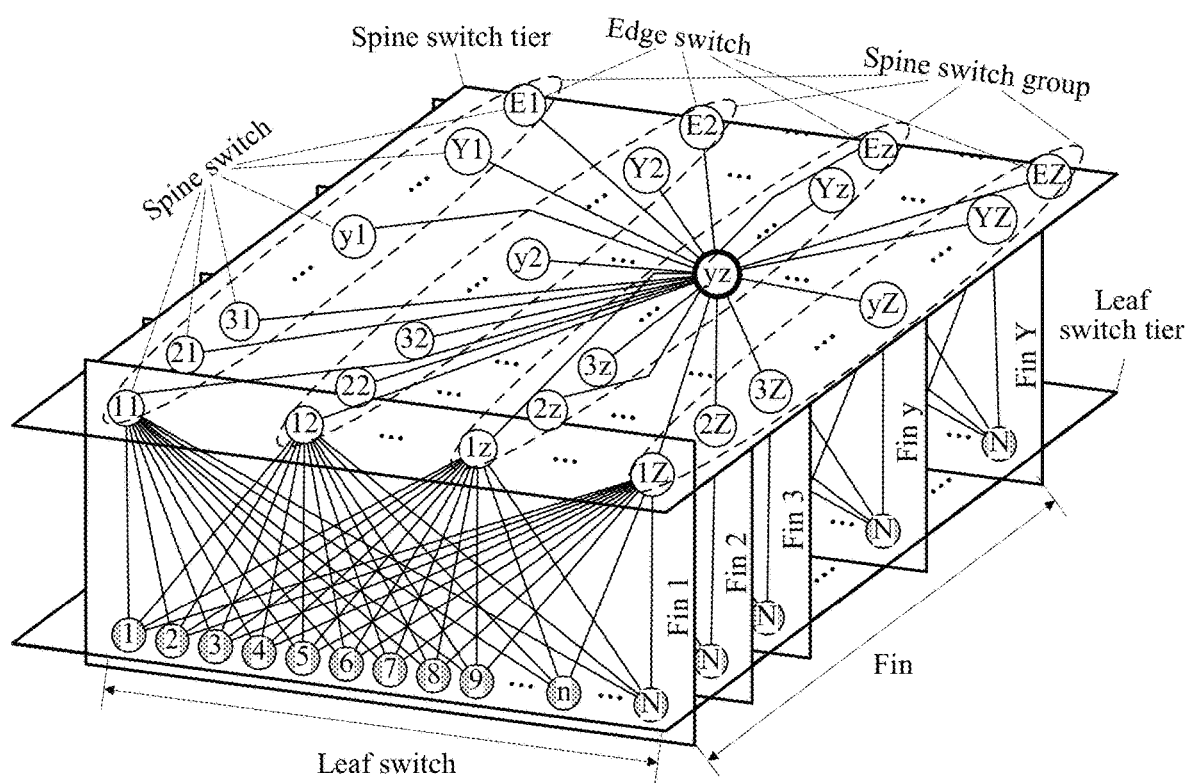

As a second implementation manner of a connection relationship between Spine switches across fins, FIG. 2C provides a data center fabric embodiment in which a Spine switch full-interconnection manner is used, and a difference from the fabrics provided in FIG. 2A and FIG. 2B mainly lies in that at a Spine switch tier included in the HeatSink fabric, each Spine switch is connected to each of other Spine switches, that is, a full-interconnection manner is used for networking among the Spine switches. Non-blocking information transmission can be implemented among the Spine switches by using the full-interconnection manner. Spine$_{yz}$ in FIG. 2C is used as an example: A connection relationship exists between the Spine switch Spine$_{yz}$ and each of other Spine switches at the Spine switch tier.

Data Center Fabric Embodiment 4

Figure 2D:
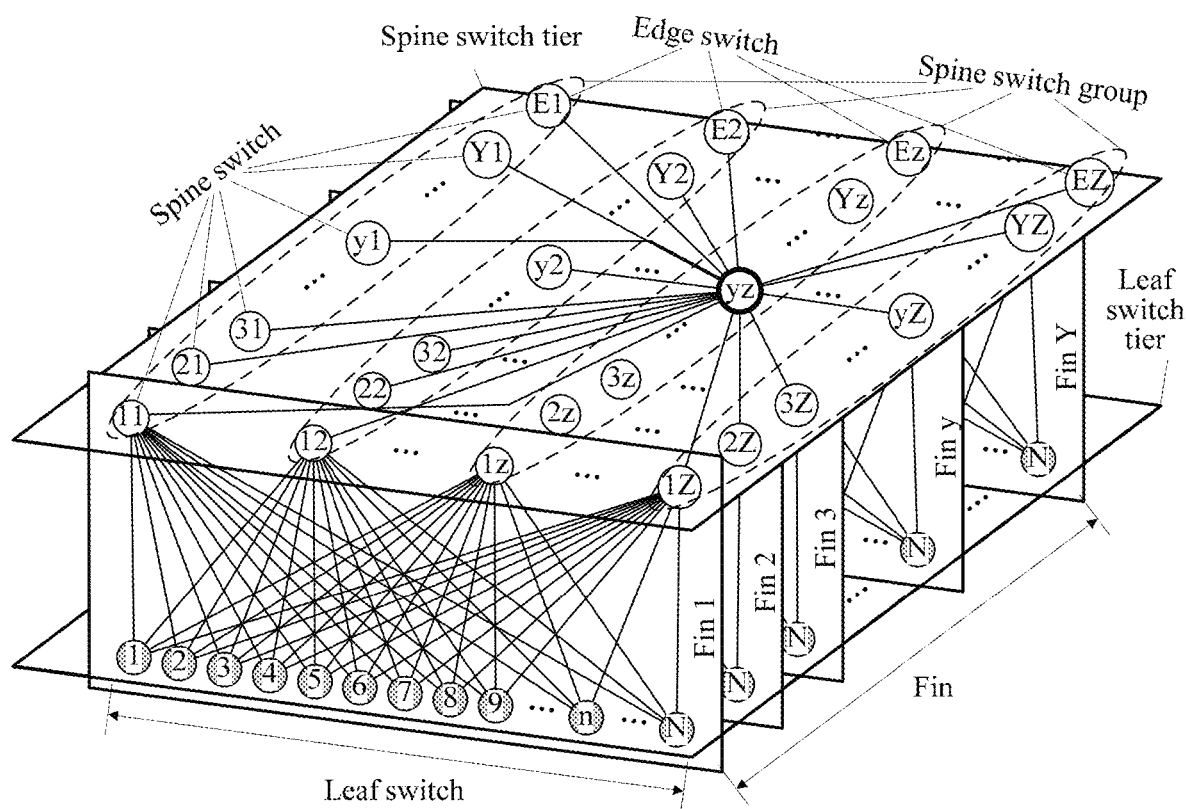

FIG. 2D provides a fourth data center fabric embodiment, and a difference from the fabrics provided in FIG. 2A to 2C mainly lies in that a Spine switch inter-group full-interconnection manner is used between Spine switches across fins. As can be seen from FIG. 2D, a Spine switch group is determined from Spine switches included in multiple fins that form the data center fabric, where the Spine switch group includes a Spine switch of each fin; and each Spine switch inside the Spine switch group is connected to each Spine switch outside the Spine switch group in which the Spine switch is located.

As an expansion of the foregoing implementation manner, that two Spine switches in one fin are selected into the Spine switch group may exist. In this case, a connection between each of the two Spine switches and each of other Spine switches outside the Spine switch group needs to be set up. This expansion manner implements a Spine switch backup, that is, when a Spine switch is faulty and cannot forward a communication message, another Spine switch may be used to forward or route a communication message between a server (a physical machine or a virtual machine) that is connected to a Leaf switch inside the fin and a server that is connected to a Leaf switch inside another fin.

As a further expansion, there may be multiple Spine switch groups selected from the Spine switch tier, and a connection between each Spine switch inside the multiple Spine switch groups and each of other Spine switches outside a Spine switch group in which the Spine switch is located is set up. Compared with the foregoing manner of setting up a Spine switch intra-group connection, a manner of setting up connections inside all the multiple Spine switch groups can increase communication links between different fins and improve reliability of a crossing-fin communication fabric.

As a specific implementation manner, Spine switches included in the Spine switch tier may be grouped by row as described in the data center fabric embodiment 2, to obtain Z Spine switch groups, which are separately Spine-G1, . . . , Spine-Gi, . . . , Spine-Gj, . . . , and Spine-GZ, at least one Spine switch group is selected from the Z Spine switch groups, and a connection between each Spine switch inside the Spine switch group and each Spine switch that is in the Spine switch tier and that is located outside the group is set up.

Compared with the Spine switch full-interconnection manner in the data center fabric embodiment 3 described herein, the foregoing Spine switch inter-group full-interconnection manner saves ports used to connect each Spine switch and other Spine switches inside the group, and these saved ports can be used to connect a newly added Leaf switch and/or a newly added Spine switch, so that network scale expansion can be implemented. The network scale expansion is to be described in detail in another embodiment below. Spine$_{yz}$ in FIG. 2D is used as an example: A Spine switch group in which the Spine switch Spine$_{yz}$ is located is {Spine$_{1z}$, Spine$_{2z}$, Spine$_{3z}$, . . . , Spine$_{yz}$, . . . , Spine$_{Yz}$, and Spine$_{Ez}$}. As shown in FIG. 2D, Spine$_{yz}$ is connected to each Spine switch outside the Spine switch group in which the Spine switch Spine$_{yz}$ is located.

To meet a communication requirement between the data center network and an external network, at least one Spine switch or at least one Leaf switch in a fin in the data center fabric is selected as an edge Edge switch, and the edge switch is connected to the external network by using a port of the edge switch. FIG. 2A to FIG. 2D are used as examples: Z Spine switches, E1 to EZ, are selected as edge switches, to connect the external network.

It should be noted that the Spine switch and the Leaf switch may be implemented by using commercial network switches, or may be implemented by using application-specific integrated circuit (Application-Specific Integrated Circuit, ASIC) chips, which is not limited in this embodiment of the present invention.

For the data center network, to better manage the Heat-Sink fabrics shown in FIG. 2A to FIG. 2D, before the network is used, the data center network manager DCNM first needs to identify a fabric according to connection relationships among all switches in the network.

Fabric Identification

In software-defined data center networking, to manage and utilize a HeatSink fabric, a controller first needs to identify the fabric effectively, that is, to identify all switching devices (Spine switches or Leaf switches) in the fabric and a connection relationship among all the switching devices.

It may be found, according to a networking feature of the HeatSink fabric and by sorting manners of aggregating different quantities of switching devices, that a crystal model exists. A specific form is shown in FIG. 3(a) to FIG. 3(c) The crystal model includes six nodes at a top, an upper left, an upper right, a lower left, a lower right, and a bottom. Each node indicates one switching device.

FIG. 3(a) to FIG. 3(c) show three different crystal models, which correspond to a crossing-fin Spine switch intra-group interconnection manner, a Spine switch full-interconnection manner, and a Spine switch inter-group full-interconnection manner in the HeatSink fabric, respectively.

FIG. 3(a) shows a crystal model corresponding to crossing-fin Spine switch intra-group interconnection, where each node is only connected to adjacent nodes.

FIG. 3(b) shows a crystal model corresponding to Spine switch full-interconnection, where four nodes at the upper left, the upper right, the lower left, and the lower right are connected to each other, the top node is connected to the upper left node and the upper right node, and the bottom node is connected to the lower left node and the lower right node.

FIG. 3(c) shows a crystal model corresponding to Spine switch inter-group full-interconnection, where four nodes at the upper left, the upper right, the lower left, and the lower right are each connected to two nodes on the opposite side (that is, the upper left node is connected to the upper right node and the lower right node, and the lower left node is connected to the upper right node and the lower right node), the top node is connected to the upper left node and the upper right node, and the bottom node is connected to the lower left node and the upper right node.

In a process of acquiring network topology information by a data center network manager DCNM, when the data center network manager DCNM finds that a crystal model in which a connection relationship of six switching devices meets the Spine switch full-interconnection manner in FIG. 3(b) or a crystal model in which a connection relationship meets the Spine switch inter-group full-interconnection manner in FIG. 3(c) exists, the data center network manager DCNM may determine that switching devices at a top node and a bottom node play a Leaf switch role in the network, and switching devices at an upper left node, an upper right node, a lower left node, and a lower right node play a Spine switch role in the network, where Spine switches at the upper left and the lower left belong to a same Group, Spine switches at the upper right and the lower right belong to another Group, switching devices at the top node, the upper left node, and the upper right node (including a Leaf switch and Spine switches) belong to a same Fin, and switching devices at the bottom node, the lower left node, and the lower right node (including a Leaf switch and Spine switches) belong to another Fin.

In the crystal model of the crossing-fin Spine switch intra-group interconnection manner in FIG. 3(a), each node may rotate clockwise or counterclockwise, which does not affect identification of the model. Therefore, in the process of acquiring the network topology information by the data center network manager DCNM, when the data center network manager DCNM finds that a crystal model in which a connection relationship of six switching devices meets the crossing-fin Spine switch intra-group interconnection exists, the data center network manager DCNM cannot determine a HeatSink attribute of each node immediately, but needs to find another crystal model in which the crossing-fin Spine switch intra-group interconnection is met, to perform the determining. As shown in FIG. 4, when the data center network manager DCNM finds that two different crystal models in which the crossing-fin Spine switch intra-group interconnection manner (as shown in FIG. 3(a)) is met exist, where four nodes, at an upper left $S_i$, an upper right $S_j$, a lower left $S_k$, and a lower right $S_l$ in the two crystal models are the same, but top and bottom nodes of the two crystal models are different, the data center network manager DCNM may determine that a current network is a HeatSink fabric using the crossing-fin Spine switch intra-group interconnection manner, switching devices at the top node and at the bottom node play a Leaf switch role in the network, and switching devices at the four nodes, at the upper left, the upper right, the lower left, and the lower right, play a Spine switch role in the network, where Spine switches at the upper left node and the lower left node belong to a same Group, Spine switches at the upper right node and the lower right node belong to another Group, all switches at the top node, the upper left node, and the upper right node belong to a same Fin, and all switches at the bottom node, the lower left node, and the lower right node belong to another Fin.

The controller identifies a component (a Spine switch, a Leaf switch, and a logical Fin and Group) in the HeatSink fabric by identifying a crystal model, and may separately determine two Groups and two Fins according to any crystal model. After determining a crystal model, the controller selects an unnumbered Group or Fin for numbering and uses a natural number for sequentially numbering. If a Group or a Fin at any node in Groups or Fins determined according to the crystal model has already been numbered, a number of the unnumbered Group or the Fin is the same as a number of the Group or the Fin at the node, so as to ensure number consistency.

Figure 5:
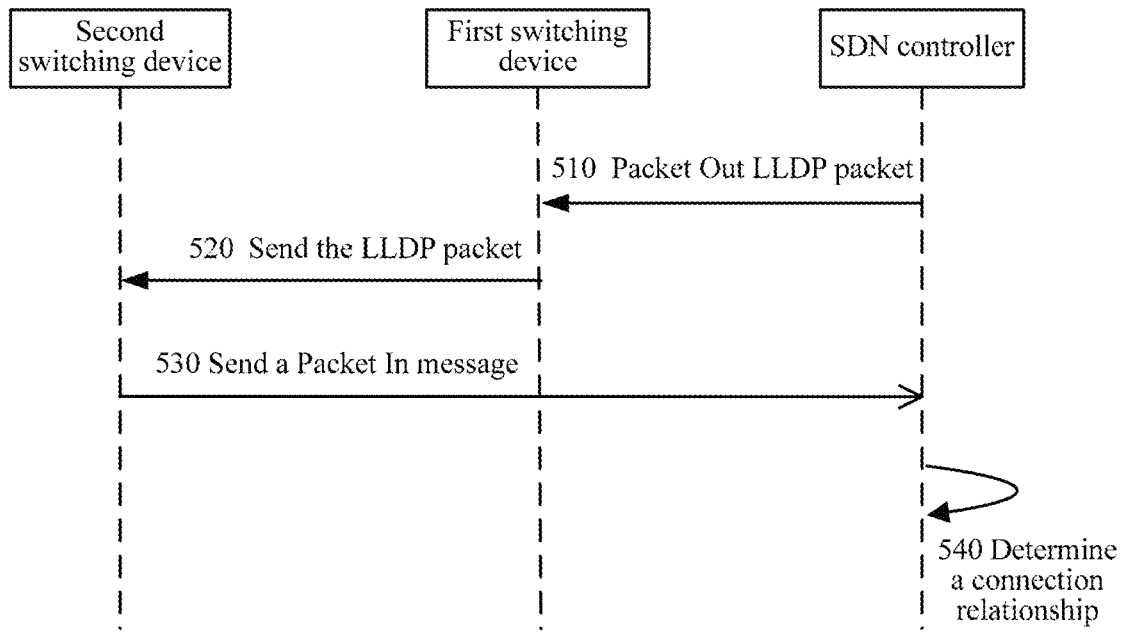
FIG. 5 is a flowchart of a network topology identification method according to an embodiment of the present invention.
Figure 6:
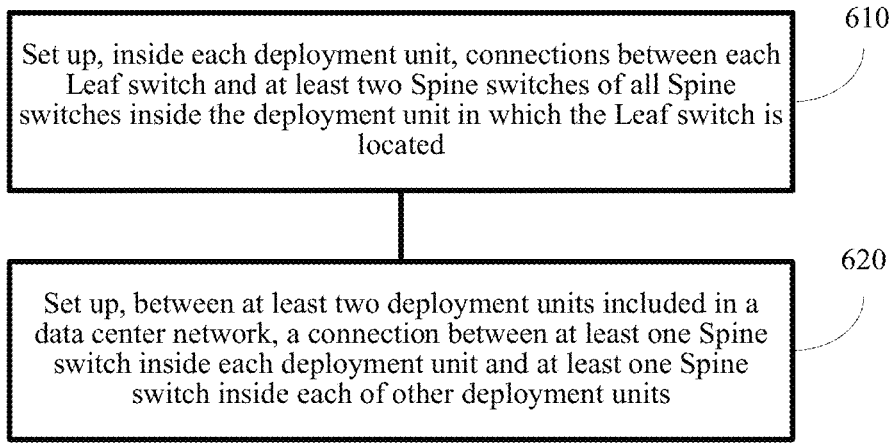
FIG. 6 is a flowchart of a data center networking method according to an embodiment of the present invention.

In addition to identifying a component in a network, the controller needs to collect topology information of the network in the following manner. Referring to FIG. 5, a SDN controller in software-defined networking is used to collect the topology information of the network by using the Link Layer Discovery Protocol (Link Layer Discovery Protocol, LLDP for short). In the following procedure, a first switching device and a second switching device are two adjacent switching devices, and the switching devices may be Spine switches or Leaf switches. The procedure includes:

510. The SDN controller generates an LLDP packet, encapsulates the packet as a Packet Out message, and sends, to the first switching device, the Packet Out message in which the LLDP packet is encapsulated, where the Packet Out message carries a first port notified to the first switching device to send the LLDP packet to the second switching device.

The LLDP packet may include only a packet header, and a packet body may include no specific content. A device identifier and the first port of the first switching device are recorded in the Packet Out message that is obtained after the encapsulation.

520. The first switching device sends the LLDP packet to the second switching device through the first port.

530. After the second switching device receives the LLDP packet, because the second switching device has no matched flow entry, the second switching device generates a Packet In message and notifies the SDN controller.

After the second switching device receives the LLDP packet, the second switching device reads the packet header of the LLDP packet to determine that the packet is the LLDP packet. If the second switching device finds that it has no flow entry for processing the LLDP packet, the second switching device generates the Packet In message and sends the Packet In message to the SDN controller, where the Packet In message carries an identifier of the second switching device and a second port, used to send the Packet In message, of the second switching device.

540. The SDN controller acquires the Packet In message and determines a connection relationship between the first switching device and the second switching device.

After receiving and parsing the Packet In message, the SDN controller acquires the identifier and the second port of the second switching device, and stores the identifier and the first port of the first switching device and the identifier and the second port of the second switching device in a MIB (Management Information Base), where the MIB is used to store network management information of a local end or a remote end in the network, where the network management information includes a device identifier, an interface identifier, a system name, system description, interface description, a device capability, a network management address, and the like, so that a network management system queries and determines communication status of a link.

Determining of a Network Identifier

In an implementation manner of a data center fabric provided in the present invention, the fabric is applied to a scenario of software-defined networking (Software-Defined Networking, SDN), that is, software-defined data center networking (Software-Defined Data Center Networking, SDDCN). In an SDDCN application scenario, a source routing (Source Routing) (also referred to as path addressing (Path Addressing)) technology is used; that is, a data packet sending end partially or wholly specifies a routing path of a data packet in a network, which replaces that a router in the network is used to determine, according to a destination address of the data packet, the routing path in the network. In a software-defined data center networking scenario, a tag encapsulated by the packet sending end generally carries a special identifier that is associated with a particular network object and that is maintained and managed by the controller (Controller) in a unified manner.

The controller determines, by identifying a connection relationship between switching devices in a HeatSink fabric, a role (a Spine switch or a Leaf switch) played by a switching device in the HeatSink fabric, a switch tier (a Spine switch tier or a Leaf switch tier) at which the switching device is located, a switch group to which the switching device belongs, a number of a fin in which the switching device is located, and a serial number SN (Serial Number) inside the fin. Based on the above, these numbers form a HeatSink attribute of the switching device. After determining a HeatSink attribute of each switching device, the controller determines a network identifier of a switching device according to a HeatSink attribute of the switching device and according to a particular encoding rule, so as to uniquely identify the switching device in a HeatSink network.

The following Table 1 is used as an example: Referring to the diagrams of the data center fabric embodiments shown in FIG. 2A to FIG. 2D, the network identifier encoding rule is as follows:

| Network object | Group number | Fin number | SN | Network identifier |
|---|---|---|---|---|
| Leaf switch | 0 | 01 | 01 | 101 |
| | 0 | 01 | 02 | 102 |
| | 0 | 01 | ... | ... |
| | 0 | 01 | N | 1N |
| | 0 | 02 | 01 | 201 |
| | 0 | 02 | 02 | 202 |
| | 0 | 02 | ... | ... |
| | 0 | 02 | N | 2N |
| | 0 | Y | 01 | Y01 |
| | 0 | Y | 02 | Y02 |
| | 0 | Y | ... | ... |
| | 0 | Y | N | YN |
| Spine switch | 1 | 01 | 00 | 10100 |
| | 1 | 02 | 00 | 10200 |
| | 1 | ... | 00 | ... |
| | 1 | Y | 00 | 1Y00 |
| | 2 | 01 | 00 | 20100 |
| | 2 | 02 | 00 | 20200 |
| | 2 | ... | 00 | ... |
| | 2 | Y | 00 | 2Y00 |
| | ... | ... | 00 | ... |
| | Z | 01 | 00 | Z0100 |
| | Z | 02 | 00 | Z0200 |
| | Z | ... | 00 | ... |
| | Z | Y | 00 | ZY00 |
| Group | 1 | 00 | 00 | 10000 |
| | 2 | 00 | 00 | 20000 |
| | ... | 00 | 00 | ... |
| | Z | 00 | 00 | Z0000 |
| Fin | 0 | 01 | 00 | 100 |
| | 0 | 02 | 00 | 200 |
| | 0 | ... | 00 | ... |
| | 0 | Y | 00 | Y00 |

A network identifier of any switching device (a Spine switch or a Leaf switch) is obtained by splicing a Group number, a Fin number, and an SN serial number. The Group number starts from 0, increases in natural number order, and occupies one decimal digit. The Fin number starts from 0, increases in natural number order, and occupies two decimal digits. The SN serial number refers to a number of a Leaf switch inside a Fin, starts from 1, increases in natural number order, and occupies two decimal digits. A Leaf switch has no Group number, and therefore, the Group number is 0. A Spine switch has no SN serial number, and therefore, the SN is 0. A Group has neither Fin number nor SN serial number, and therefore, both the Fin number and the SN serial number are 0. A Fin has neither Group number nor SN serial number, and therefore, both the Group number and the SN serial number are 0.

The foregoing network identifier uses a most intuitive encoding manner and is applicable to a HeatSink fabric in the following scale: An upper limit of a quantity Z of Groups is 9, an upper limit of a quantity Y of Fins is 99, and an upper limit of a quantity N of Leaf switches inside a Fin is 99. It may be understood that if more digits are used to separately indicate the Group number, the Fin number, or the SN serial number, in this case, a network scale that can be indicated by using this encoding rule is larger (A scale of the network is limited by some physical parameters such as a quantity of ports of the Spine switch and a quantity of ports of the Leaf switch).

Because of uncertainty about a time point for a switch getting online, for reporting interface status of a switch, for link discovery, and the like, although a physical position of a switching device in the HeatSink fabric is not changed, the HeatSink fabric identified by the controller each time may be different, which severely affects network visibility and is adverse to network maintenance. To ensure consistency of the HeatSink fabric identified by the controller, after successfully identifying the HeatSink fabric for the first time, the controller needs to perform persistence processing on HeatSink attributes of all switches, for example, storing the HeatSink attributes of all the switches in a network information base (Network Information Base, NIB for short). Because a HeatSink attribute of a switching device can be restored and determined by using a network identifier, the controller needs to store only the network identifier of the switching device. Even if the controller restarts after power-off, the controller no longer needs to identify the HeatSink fabric, but needs to directly extract the network identifier of the switching device from the NIB and then parses out the HeatSink attribute of the switching device.

Source Routing Based on a Network Identifier

In a HeatSink network, a forwarding path in crossing-Fin communication is the longest. A packet is sent from a source end (a physical machine or a source virtual machine sending the packet), needs to successively pass a Src vSW (a virtual switch that is connected to the source physical machine or the source virtual machine, source virtual switch for short), a Src Leaf (a Leaf switch that is connected to the source virtual switch, source Leaf switch for short), a Src Spine (a Spine switch that is connected to the source Leaf switch, source Spine switch for short), a Relay Spine (used as a Spine switch with a transit function, that is, referred to as a transit Spine switch), a Dst Spine (a destination Spine switch, that is, a Spine switch that is connected to a destination Leaf switch), the Dst Leaf (the destination Leaf switch, that is, a Leaf switch that is connected to a destination virtual switch), the Dst vSW (the destination virtual switch, that is, a virtual switch that is connected to a destination physical machine or a destination virtual machine), and finally arrives at a destination end (the destination physical machine or the destination virtual machine receiving the packet). There are six hops in total.

Co-Fin communication is further divided into co-Leaf communication or crossing-Leaf communication. A packet in the co-Leaf communication is sent from a source end, needs to successively pass a Src vSW (a virtual switch that is connected to a source physical machine or a source virtual machine, source virtual switch for short), a Leaf (a Leaf switch that is located between the source virtual switch and a destination virtual switch and has a transit function), the Dst vSW (the destination virtual switch, that is, a virtual switch that is connected to a destination virtual machine), and finally arrives at a destination end (a destination physical machine or the destination virtual machine receiving the packet). There are two hops in total. A packet in the crossing-Leaf communication is sent from a source end, needs to successively pass a Src vSW (a virtual switch that is connected to a source physical machine or a source virtual machine, source virtual switch for short), a Src Leaf (a Leaf switch that is connected to the source virtual switch, source Leaf switch for short), a Spine (a Spine switch that is located between the source Leaf switch and a destination Leaf switch and has a transit function), the Dst Leaf (the destination Leaf switch, that is, a Leaf switch that is connected to a destination virtual switch), the Dst vSW (the destination virtual switch, that is, a virtual switch that is connected to a destination physical machine or a destination virtual machine), and finally arrives at a destination end (the destination physical machine or the destination virtual machine receiving the packet). There are four hops in total.

In a source routing technology, a tag is used to identify a network object (that is, a unit in the network, for example, a Spine switch or a Leaf switch), where one tag may carry one network identifier, and multiple tags carry multiple network identifiers in a nested manner in order, to obtain one forwarding path by means of combination. An outer tag is always used to indicate a next-hop switching device of a packet on a current switching device. After a task is completed, and before the packet is sent to the next-hop switching device, the outer tag is removed by the current switching device. This process repeats, and the packet is restored to its original status on a last-hop switching device.

Embodiment of a Networking Method for a Data Center Network Provided in the Present Invention For the data center fabrics provided in FIG. 2A to FIG. 2D, the present invention further provides an embodiment of a data center networking method. Referring to a flowchart in FIG. 7, the embodiment may be implemented by a data center network manager DCNM. The data center network includes at least two deployment units, and each deployment unit includes at least two Spine switches and at least one Leaf switch. It should be noted that for the data center fabrics shown in FIG. 2A to FIG. 2D, the deployment unit mentioned in this embodiment of the present invention is corresponding to the fin shown in the data center fabric embodiment.

610. Set up, inside each deployment unit, connections between each Leaf switch and at least two Spine switches of all Spine switches inside the deployment unit in which the Leaf switch is located.

It should be noted that for the data center fabrics shown in FIG. 2A to FIG. 2D, a connection relationship between a Leaf switch and a Spine switch inside a deployment unit is set up, to implement a forwarding link between the Leaf switch and the Spine switch inside the deployment unit.

620. Set up, between the at least two deployment units included in the data center network, a connection between at least one Spine switch inside each deployment unit and at least one Spine switch inside each of other deployment units.

It should be noted that for the data center fabrics shown in FIG. 2A to FIG. 2D, a connection between Spine switches of fins is set up, to meet a crossing-fin communication requirement.

In the data center fabric embodiments shown in FIG. 2A to FIG. 2D, in a preferable implementation manner of a connection relationship inside a fin, inside each fin, a connection between each Spine switch and each Leaf switch that are inside the deployment unit in which the Spine switch is located is set up, that is, the Spine switch and the Leaf switch inside the fin are connected by using a CLOS network, so that non-blocking communication can be implemented.

The data center fabric embodiments shown in FIG. 2A to FIG. 2D are used as examples: Three typical manners for implementing a connection relationship between fins are as follows:

Manner 1: A crossing-fin Spine switch intra-group interconnection manner is as follows:

determining some Spine switches from Spine switches included inside all fins in the data center network to form a Spine switch group, where the Spine switch group includes at least one Spine switch inside each fin; and inside the Spine switch group, setting up a connection between each Spine switch and a Spine switch inside another fin.

Manner 2: A Spine switch full-interconnection manner is as follows:

setting up, from Spine switches included inside all fins in the data center network, a connection between each Spine switch and each of other Spine switches.

Manner 3: A Spine switch inter-fin full-interconnection manner is as follows:

setting up, from Spine switches included inside all fins in the data center network, a connection between each Spine switch and each Spine switch outside a fin in which the Spine switch is located.

Considering expansion of a data center network scale, with reference to the data center fabrics shown in FIG. 2A to FIG. 2D, three expansion solutions are as follows:

(1) Add a new Leaf switch inside a fin.

Figure 7:
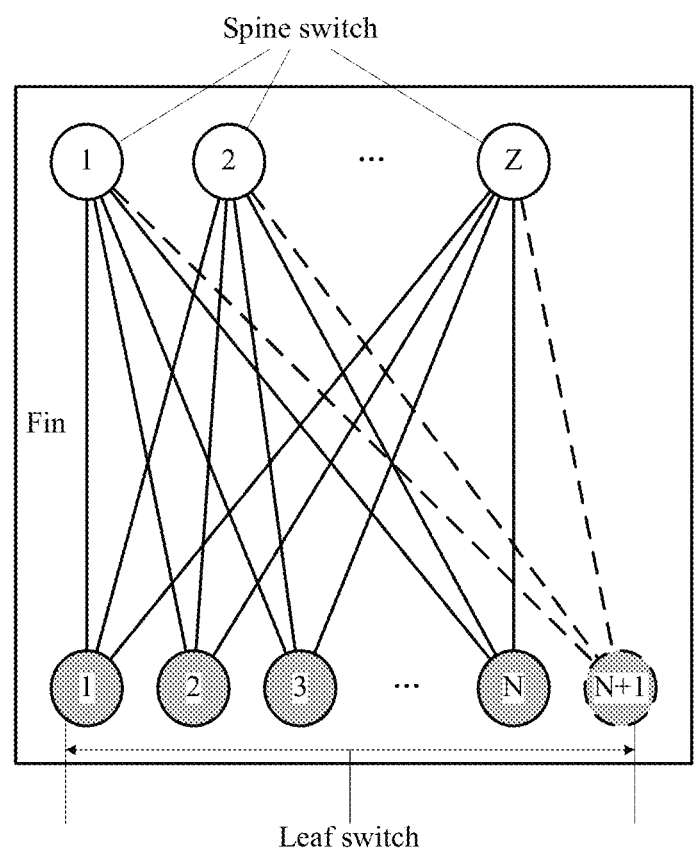
FIG. 7 is a schematic diagram of adding a Leaf switch inside a Fin of a data center network according to the present invention.

Referring to FIG. 7, a new Leaf switch is added inside a fin. A connection between the newly added Leaf switch and each of at least two Spine switches inside the fin in which the Leaf switch is located needs to be set up. FIG. 7 is used as an example, where $Leaf_{N+1}$ is the newly added Leaf switch, and connections (refer to dashed lines in FIG. 7) between the newly added Leaf switch and Spine switches inside the Fin need to be set up.

In an embodiment in which a Spine switch and a Leaf switch inside a fin are connected by using a Clos network, a connection between the newly added Leaf switch and each Spine switch inside the fin is set up.

(2) Add a new Spine switch inside a fin.

Figure 8:
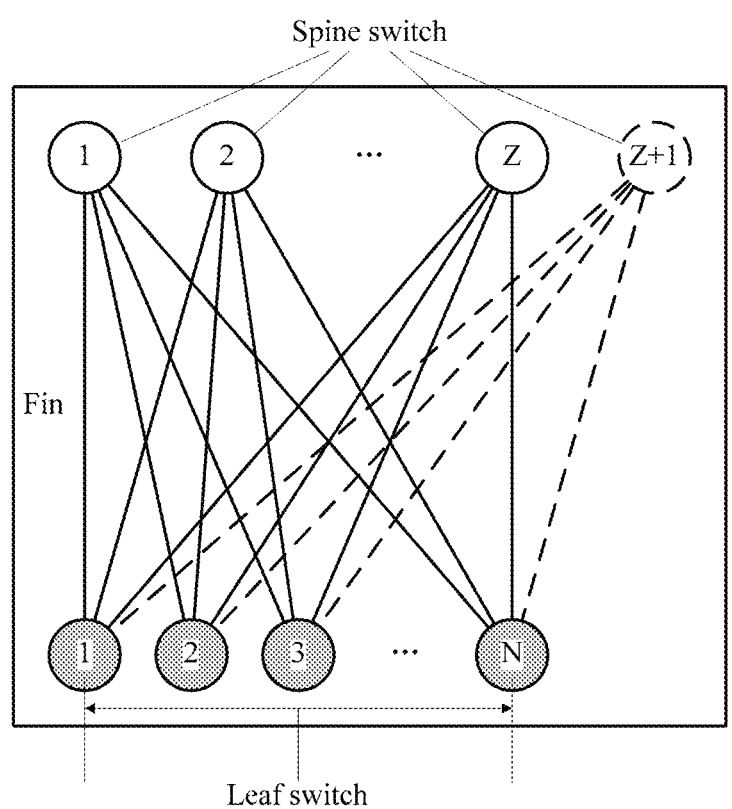
FIG. 8 is a schematic diagram of adding a Spine switch inside a Fin of a data center network according to the present invention.

A. For a basic Spine switch interconnection manner:

Referring to FIG. 8, a new Spine switch is added inside a fin. A connection between the newly added Spine switch and each Leaf switch inside the fin in which the newly added Spine switch is located is set up. FIG. 8 is used as an example, where $Spine_{Z+1}$ is the newly added Spine switch, and connections (refer to dashed lines in FIG. 8) between the newly added Spine switch and Leaf switches inside the Fin need to be set up.

In another implementation manner, when a new Spine switch is added inside a fin, and then it is determined that a CLOS network connection between a Spine switch and a Leaf switch exists inside the fin, it may not need to set up a connection between the newly added Spine switch and a Leaf switch inside the fin.

B. For a crossing-fin Spine switch intra-group interconnection manner:

If a new Spine switch is added inside only one fin in a HeatSink fabric, a connection between the newly added Spine switch and each Leaf switch inside the fin in which the newly added Spine switch is located is set up.

If a new Spine switch is added inside each fin in the HeatSink fabric, a connection between the newly added Spine switch and each Leaf switch inside the fin also needs to be set up. For a connection of the newly added Spine switch at a Spine switch tier, two implementation manners exist as follows:

(a) The newly added Spine switch inside each fin is used as a group, and a connection between each Spine switch inside the group and each of other Spine switches inside the group is set up.

(b) No connection relationship exists for the newly added Spine switch inside each fin.

C. For a Spine switch full-interconnection manner:

A new Spine switch is added inside a fin. A connection between the newly added Spine switch and each Leaf switch inside the fin in which the newly added Spine switch is located is set up, and a connection between the newly added Spine switch and each of other Spine switches in Spine switches included in a Spine switch tier is set up.

D. For a Spine switch inter-fin full-interconnection manner:

A new Spine switch is added inside a fin. It is determined that the newly added Spine switch is located in a Spine switch group. A connection between the newly added Spine switch and each Leaf switch inside the fin in which the newly added Spine switch is located is set up, and a connection between the newly added Spine switch and each of other Spine switches that is at a Spine switch tier and that is outside the Spine switch group in which the newly added Spine switch is located is set up.

(3) Add a new fin in the data center network.

A. In the embodiment shown in FIG. 2A, if a new fin is added, where the fin includes at least two Spine switches and at least one Leaf switch, the following operations need to be performed:

setting up connections between each Leaf switch and the at least two Spine switches inside the newly added fin; and selecting at least one Spine switch from the newly added fin, and setting up a connection between the selected at least one Spine switch and at least one Spine switch that is inside each of other fins and that is outside the newly added fin.

B. In the embodiment shown in FIG. 2A, if a full-interconnection manner is used between a Spine switch and a Leaf switch inside a fin, and if a new fin is added, where the fin includes at least two Spine switches and at least one Leaf switch, the following operations need to be performed:

setting up a connection between each Leaf switch and each Spine switch inside the newly added fin; and selecting at least one Spine switch from the newly added fin, and setting up a connection between the selected at least one Spine switch and at least one Spine switch that is inside each of other fins and that is outside the newly added fin.

C. In the embodiment shown in FIG. 2B, for the crossing-fin Spine switch intra-group interconnection manner, if a new fin is added, where the newly added fin includes at least two Spine switches and at least one Leaf switch, a connection between each Spine switch and each Leaf switch that are inside the newly added fin is set up; and at least one Spine switch is selected from the newly added fin, and a connection between the selected at least one Spine switch and each Spine switch inside a Spine switch group is set up.

D. In the embodiment shown in FIG. 2C, for the Spine switch full-interconnection manner, if a new fin is added, where the newly added fin includes at least two Spine switches and at least one Leaf switch, a connection between each Spine switch and each Leaf switch that are inside the newly added fin is set up; and a connection between each Spine switch inside the newly added fin and each Spine switch of Spine switches originally included in the data center network is set up.

E. In the embodiment shown in FIG. 2D, for the Spine switch inter-fin full-interconnection manner, if a new fin is added, where the newly added fin includes at least two Spine switches and at least one Leaf switch, a connection between each Spine switch and each Leaf switch that are inside the newly added fin is set up;

at least one Spine switch is selected from the newly added fin into a Spine switch group;

a connection between the at least one Spine switch that is selected from the newly added fin into the Spine switch group and each Spine switch that is located outside the Spine switch group is set up.

To meet a communication requirement between the data center network and an external network, at least one fin included in the data center network is selected, and the external network is connected by using a port of a Spine switch of the fin or a port of a Leaf switch of the fin.

It should be noted that in a specific implementation, the Spine switch and the Leaf switch that are mentioned in this embodiment of the present invention may be implemented by using commercial network switches, or may be implemented by using application-specific integrated circuit ASIC chips.

Embodiment of a Non-Volatile Computer-Readable Storage Medium

The present invention further provides an embodiment of the non-volatile computer-readable storage medium, where the medium is used to store computer-readable instructions, and the instructions are used to set up links in a data center network. When these instructions are executed by at least one processor in a computer, the at least one processor can be enabled to execute some or all processes of the networking method for a data center network in the embodiments of the present invention.

It should be understood that specific examples in the present invention are only intended to help a person skilled in the art to better understand the embodiments of the present invention, but not to limit the scope of the embodiments of the present invention.

It should be understood that although the terms, such as "first" and "second", may be used in the embodiments of the present invention to describe various deployment units or fins, the deployment units or fins are not limited to these terms; that is, neither "first deployment unit or fin" nor "second deployment unit or fin" indicates a particular deployment unit or fin, or indicates that a sequential relationship exists between the first deployment unit or fin and the second deployment unit or fin, and these terms are only used to distinguish the deployment units or fins from each other. For example, in a case without departing from the scope of the embodiments of the present invention, a first deployment unit or fin may also be referred to as a second deployment unit or fin, and similarly, a second deployment unit or fin may also be referred to as a first deployment unit or fin. Likewise, a second deployment unit or fin may also be referred to as a third deployment unit or fin, and so on, which is not limited in the embodiments of the present invention.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, and a specific process of a method, reference may be made to corresponding descriptions in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention.

What is claimed is:

1. A data center network, comprising deployment units including a first deployment unit, a second deployment unit and a third deployment unit, wherein
   each deployment unit comprises two layers of switches, a first layer of switches comprising a plurality of Spine switches and a second layer of switches comprising at least one Leaf switch; and, wherein
   each Spine switch inside said each deployment unit is connected to each Leaf switch inside said each deployment unit; and
   at least one Spine switch inside the first deployment unit is directly connected to at least one Spine switch inside the second deployment unit through a physical connection or connected to at least one Spine switch inside the second deployment unit through one or more Spine switch inside the third deployment unit, wherein the physical connection comprises no further switch; and, wherein:
   at least one Spine switch group is determined from the deployment units, each Spine switch group comprises at least one Spine switch inside said each deployment unit, and inside the Spine switch group, each Spine switch inside the first deployment unit is connected to each Spine switch inside the second and the third deployment units.

2. The data center network according to claim 1, wherein each Spine switch inside the deployment units is connected to each of other Spine switches inside the deployment units.

3. A networking method for a data center network, comprising:
   providing deployment units including a first deployment unit, a second deployment unit and a third deployment unit, wherein each deployment unit comprises two layers of switches, a first layer of switches comprising at least two Spine switches and a second layer of switches comprising at least one Leaf switch;
   setting up a connection between each Spine switch inside said each deployment unit and each Leaf switch inside said each deployment unit; and
   setting up a direct physical connection between at least one Spine switch inside the first deployment unit and at least one Spine switch inside the second deployment unit or a connection between at least one Spine switch inside the first deployment unit and at least one Spine switch inside the second deployment unit through one or more Spine switch inside the third deployment unit, wherein the physical connection comprises no further switch; and, wherein:
   at least one Spine switch group is determined from the deployment units, each Spine switch group comprising at least one Spine switch inside said each deployment unit; and
   inside the Spine switch group, a connection between each Spine switch inside the deployment unit and each Spine switch inside each of the second and the third deployment units is setup.

4. The networking method according to claim 3, wherein a connection between each Spine switch inside the deployment units and each of other Spine switches inside the deployment units is set up.

5. The networking method according to claim 3, wherein a new Leaf switch is added inside said each deployment unit, and a connection between the new Leaf switch and each of the Spine switches inside said each deployment unit is set up.

6. The networking method according to claim 3, wherein a new Leaf switch is added into said each deployment unit, and a connection between the new Leaf switch and each Spine switch inside said each deployment unit is set up.

7. The networking method according to claim 3, wherein a new Spine switch is added into said each deployment unit, and a connection between the new Spine switch and each Leaf switch inside said each deployment unit is set up.

8. The networking method according to claim 4, wherein a new Spine switch is added into said each deployment unit, a connection between the new Spine switch and each Leaf switch inside said each deployment unit is set up, and a connection between the new Spine switch and each of other Spine switches inside the at least two deployment units is set up.

9. The networking method according to claim 3, further comprising
   adding a new deployment unit to the data center network, the new deployment unit comprising at least two Spine switches and at least one Leaf switch;
   setting up a connection between each Leaf switch inside the new deployment unit and each of the at least two Spine switches inside the new deployment unit;
   selecting at least one Spine switch from the new deployment unit; and
   setting up a connection between the selected at least one Spine switch and at least one Spine switch that is inside each of other deployment units and that is outside the new deployment unit.

10. The networking method according to claim 3, further comprising
    adding a new deployment unit to the data center network, the new deployment unit comprising at least two Spine switches and at least one Leaf switch;
    setting up a connection between each Leaf switch inside the new deployment unit and each Spine switch inside the new deployment unit; and
    selecting at least one Spine switch from the new deployment unit, and setting up a connection between the selected at least one Spine switch and at least one Spine switch that is inside each of other deployment units and that is outside the new deployment unit.

11. The networking method according to claim 3, further comprising adding a new deployment unit to the data center network, the new deployment unit comprising at least two Spine switches and at least one Leaf switch;
    setting up a connection between each Leaf switch inside the new deployment unit and each Spine switch inside the new deployment unit;
    selecting at least one Spine switch from the new deployment unit to be included in said each Spine switch group; and setting up a connection between the selected at least one Spine switch and each Spine switch inside said each Spine switch group.

12. The networking method according to claim 4, further comprising adding a new deployment unit to the data center network, the new deployment unit comprising at least two Spine switches and at least one Leaf switch;
    setting up a connection between each Leaf switch inside the new deployment unit and each Spine switch inside the new deployment unit is set up; and
    setting up a connection between each Spine switch inside the new deployment unit and each Spine switch inside the at least two deployment units.

13. A non-transitory computer-readable storage medium comprising instructions which, when executed by a computer, cause the computer to perform the followings:
    providing deployment units including a first deployment unit, a second deployment unit and a third deployment unit, wherein each deployment unit comprises two layer of switches, a first layer of switches comprising at least two Spine switches and a second layer of switches comprising at least one Leaf switch;
    setting up a connection between each Spine switch inside said each deployment unit and each Leaf switch inside said each deployment unit; and
    setting up a direct physical connection between at least one Spine switch inside the first deployment unit and at least one Spine switch inside the second deployment unit or a connection between at least one Spine switch inside the first deployment unit and at least one Spine switch inside the second deployment unit through one or more Spine switch inside the third deployment unit, wherein the physical connection comprises no further switch;
    wherein at least one Spine switch group is determined from the deployment units, each Spine switch group comprising at least one Spine switch inside said each deployment unit;
    and inside the Spine switch group, a connection between each Spine switch inside the deployment unit and each Spine switch inside each of the second and the third deployment units is setup.

* * * * *